April 19, 1927.
H. B. CRAMER
BAKING PAN
Filed July 12, 1926
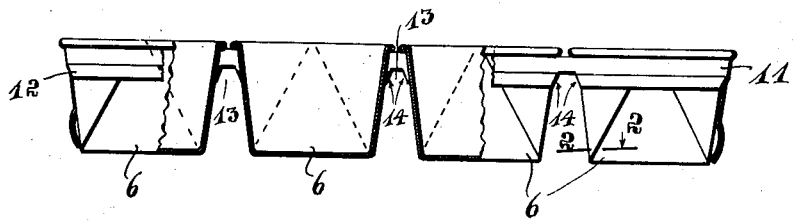
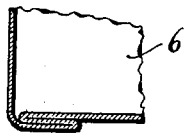
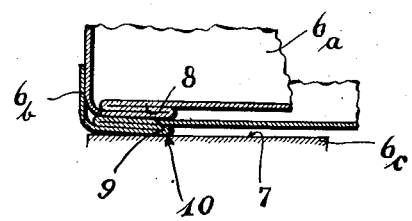
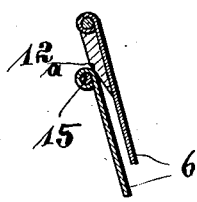
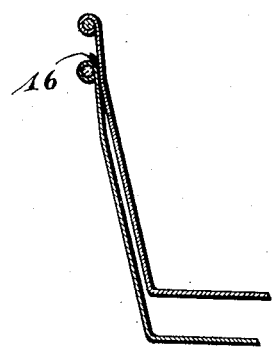
INVENTOR:
HENRY B. CRAMER,
By: Otto H. Ruger,
his Atty.

Patented Apr. 19, 1927.

1,625,525

UNITED STATES PATENT OFFICE.

HENRY B. CRAMER, OF SAN DIEGO, CALIFORNIA.

BAKING PAN.

Application filed July 12, 1926. Serial No. 121,900.

This invention relates to devices used for holding dough during the baking.

One of the objects of this invention is to provide means by which pans are united into groups designed in such a manner that such united pans can be stacked or piled up without damaging one another.

Another object is to provide spacing means near the upper edges of pans by which the pans may be held in spaced relation one on top of the other.

Another object is to provide baking-pans with spacing means at points normally not affecting dough disposed in such pans.

Other objects will appear from the following description and appended claims as well as from the accompanying drawing, in which—

Fig. 1 is a side elevation of a group of interconnected baking-pans of a customary form provided with spacing means in accordance with this invention.

Fig. 2 is a fragmentary detail enlarged horizontal section through a corner of a baking-pan on approximately the line 2—2 of Fig. 1.

Fig. 3 is a section similar to the illustration of Fig. 2, showing one pan in a position as inserted in another pan.

Fig. 4 is a fragmentary detail vertical section, illustrating simple spacing means in form of a strip or bar around the upper edge of the pan provided with the beveled edge by which a uniform spacing is maintained.

Fig. 5 is a fragmentary vertical section of a slightly modified form by which a spacing of stacked pans is accomplished.

While the bread-buying public may generally be under the impression that the brown or burned-looking markings on bread are caused by the negligence or inattention of a baker, they are in fact more likely caused by damaged baking-pans.

Through years of experience it has been observed that shaved-off surfaces in baking-pans have the tendency of influencing the looks of baked goods, and even new but damaged pans will cause a burned or brown appearance on the baked goods.

In bakeries where a multitude of pans are required to supply the necessary forms for baked goods, any pans not momentarily filled with dough are commonly stacked and piled up with the outside of one pan slipped into the inside of another pan. Since the stacking is done very rapidly and also very frequently, it is a very common occurrence that the insides of pans are shaved or rubbed off wherever one pan is thus frequently brought into contact with another pan by such a stacking, and the surface of a pan through such contacting is damaged to such an extent that it will influence the baked goods during the baking.

The principal feature of this invention is therefore to provide such spacing means that will eliminate any undesired touching or contacting of pans while stacked or piled up, however slight the spacing may be.

As illustrated in the drawing a pan is commonly made of one piece of material with the corners folded in, in such a manner that no leak is left in the completed pan, the folding of the corners being illustrated in Fig. 1, 2 and 3.

Of course, the material of pans is comparatively thin, though it may appear rather thick from the illustrations. But even thin sheet iron, when folded up in this manner, makes an even touching of all outside surfaces of one pan with all inside surfaces of another pan absolutely impossible. The folded material always causes a more intense rubbing or contacting between stacked pans than the portions consisting of single thickness of sheet metal. This result will be best understood from the illustration in Fig. 3. The pan portion $6_a$ may in this case be said to be inserted into the inside of another pan portion $6_b$, and the line 7 may indicate the inner surface of another pan $6_c$.

A stacking of pans in this manner appears to force the material of pans outwardly as illustrated by the several contacting surfaces. The outer surface of the folded material at 8 causes a further forcing of the folded material 9 outwardly so that the outermost edge as at 10 will contact and rub on the inside of the next following pan, and, through a frequent stacking, the inside of a pan, as on the surface 1, may be shaved and damaged to actually affect the looks of the baked goods, disposed in such a pan.

Though it has been found that frequent greasing will avoid a marking of baked goods to some extent, however it is not practical to follow such a procedure.

Baking-pans, moreover, are generally grouped or united together by connecting means. The strip or bar 11 in Fig. 1 is a simple form for connecting several pans into one group.

Nevertheless, if no further means for spacing are provided the grouped pans can slip from side to side and still cause a rubbing of the outside of one group of pans on the inside of another group of pans.

When using this strip 11 I prefer to provide a beveled edge 12 on the strip projecting downwardly from the upper end of the pan, and also provide notches 13 at points between the pans in the same strips, these notches being also provided with beveled or inclined edges 14 by which a lateral engagement can be accomplished between the outside of one pan with the inside of another pan and near the upper adjoining edges of the pans at points where no baking goods can possibly be affected, even if pans should be rubbed or shaved at this point. In Fig. 4, for instance, the beveled edge at 12, engages the rolled-in edge 15 of the next following pan.

In this manner it is immaterial if the spaces between different pans vary inasmuch as the beveled edge 12 will slip into proper engagement with the next following pan regardless of variations on such spacings. Notches 13 are, for this reason provided with the inclined or beveled edges 14 to similarly engage the adjoining edges of the next following group in stacked condition. With such beveled edges a very slight spacing may be sufficient to avoid an undesired rubbing of one pan against the other, since pans will easily centralize themselves by means of the beveled edges, one pan within another.

A slightly modified form of spacing means is illustrated in Fig. 5. Instead of having extra strips with beveled edges on a pan, the material of the pan itself is shaped to assure a spacing of the larger portions of the stacked pans, while parts of the upper open ends of the pans alone are hereby and herein made to contact as indicated at 16.

Though a certain type and shape of pans has been shown in the drawing it is, of course, understood that the feature disclosed herewith can be applied to other types and shapes of pans.

Whether extra spacing-strips are added to pans or the material of pans is directly shaped to form suitable spacing means is immaterial, and I do not limit myself to the beveling and notching of strips alone, I may use slightly modified forms of spacing means within the scope of the appended claims.

Having thus described my invention, I claim:

1. In combination with pans united into a group, a strip around the upper edges of the united pans formed for gradually guiding and for equally spacing the pans in all lateral directions within the upper edges of another group of pans when so placed.

2. In combination with pans united into a group, a strip around the upper edges of the united pans having notches at points between the pans and adapted to equally space the pans in all lateral directions within the upper edges of another group of pans when so placed.

3. In combination with pans united into a group, a strip around the upper edges of the pans having a beveled edge projecting downwardly to slip into another group of pans for spacing the first-named group of pans within other pans when so placed equally in all lateral directions.

4. In combination with pans united into a group, a strip around the upper edges of the pans having a beveled edge projecting downwardly to slip into another group of pans for spacing the first-named group of pans within other pans when so placed equally in all lateral directions, the said strip having notches in their lower edges for facilitating an equal spacing within the upper ends of other pans.

5. In combination with pans united into a group, a strip around the upper edges of the pans having a beveled edge projecting downwardly to slip into another group of pans for spacing the first-named group of pans within other pans when so placed equally in all lateral directions, the said strip having notches with inclined sides to engage over the upper edges for equally spacing the pans in the upper ends of other pans.

In testimony that I claim the foregoing as my invention I have signed my name.

HENRY B. CRAMER.